3,234,015
HEAVY DUTY, WEAR RESISTANT MACHINE ELEMENT
Dougles E. Jones, 1716 7th St., Menominee, Mich.
No Drawing. Filed May 1, 1961, Ser. No. 106,503
5 Claims. (Cl. 75—171)

This invention relates to wear resistant elements formed of nickel-base, non-magnetic alloys rich in chromium and containing complex carbides arranged along the path of dendritic growth in a nickel rich matrix. The elements may be in the form of valves, valve seat inserts, and other machine elements for use in heavy duty applications wherein the operating temperatures, pressures and corrosive atmospheres are extremely severe. The invention also relates to the compositions from which such machine elements may be formed.

A principal object of the invention is the provision of heavy duty, wear resistant elements, such as hard faced or surfaced valves and valve inserts, which may be used in heavy duty applications wherein they must be able to withstand extremely severe operating temperatures, pressures and corrosive atmospheres without losing their hardness.

Another important object of the invention is the provision of alloys for making such heavy duty, wear resistant elements which when cast require only a simple stress relief heat treatment from the as cast condition giving a hardness within the range of about 35–45 on the Rockwell "C" scale.

Certain other objects of the invention will be apparent from the following more detailed description and the appended claims.

The machine elements of this invention may be formed of alloys falling within the following general composition:

| | Percent by weight |
|---|---|
| Chromium | 25.00–32.00 |
| Cobalt | 13.00–20.00 |
| Iron | 0.0–9.0 |
| Vanadium | 1.25–3.0 |
| Molybdenum | 1.25–3.0 |
| Silicon | 0.5–1.75 |
| Carbon | 1.75–3.50 |
| Nickel | Balance |

Alloys from which machine elements may be made having excellent properties according to this invention have the following preferred composition:

| | Percent by weight |
|---|---|
| Chromium | 26.50–30.50 |
| Cobalt | 15.00–17.00 |
| Iron | 9.0 maximum |
| Vanadium | 1.75–2.25 |
| Molybdenum | 1.75–2.25 |
| Silicon | 0.80–1.20 |
| Carbon | 2.20–2.80 |
| Nickel | Balance |

Alloys of the foregoing preferred analysis are useful for valve inserts and valves for all types of internal combustion engines. These alloys may also be used to make other machine elements which must exhibit heavy duty wear resistance under severe operating conditions, such as ball bearing balls and races, burnishing balls and rollers, rock drill types and bearings.

The three following formulations falling within the general composition set forth above have the special properties indicated by their respective headings:

MAXIMUM HOT HARDNESS

| | |
|---|---|
| Chromium | 28.00–29.50 |
| Cobalt | 15.00–15.50 |
| Iron | 9 maximum |
| Vanadium | 2.00–2.25 |
| Molybdenum | 2.00–2.25 |
| Silicon | 1.10–1.30 |
| Carbon | 2.60–2.80 |
| Nickel | Balance |

MAXIMUM HOT STRENGTH

| | |
|---|---|
| Chromium | 29.50–30.50 |
| Cobalt | 16.50–17.00 |
| Iron | 9 maximum |
| Vanadium | 2.00–2.25 |
| Molybdenum | 2.00–2.25 |
| Silicon | 1.10–1.30 |
| Carbon | 2.60–2.80 |
| Nickel | Balance |

MAXIMUM DUCTILITY

| | |
|---|---|
| Chromium | 26.00–27.00 |
| Cobalt | 16.50–17.00 |
| Iron | 9 maximum |
| Vanadium | 1.75–2.00 |
| Molybdenum | 1.75–2.00 |
| Silicon | .90–1.10 |
| Carbon | 2.20–2.50 |
| Nickel | Balance |

The following specific example will serve to further illustrate how this invention may be practiced.

Example 1

The following is typical of a production heat of approximately 210 pounds.

| Melt formula: | Lbs. |
|---|---|
| Nickel metal | 86.0 |
| Cobalt metal | 36.3 |
| Electrolytic chromium | 47.7 |
| 6% carbon ferrochrome (68% Cr) | 25.0 |
| Carbon | 4.2 |
| Ferrosilicon (83% Si) | 1.1 |
| Ferrovanadium (74% V) | 5.9 |
| Ferromolybdenum (62% Mo) | 8.5 |

(a) Elements and alloys may be melted in any suitable melting device, although induction melting lends itself to better control. Additionally, while air melting produces satisfactory results, melting under inert atmosphere (i.e. argon), or vacuum will generally produce improved physical properties, lower melt losses and cleaner metal. When air melting, and to a less degree when using argon, deoxidization using rare earths in combination with nickel zirconium and ferrosilicon prove beneficial.

(b) This alloy may be cast into almost any type mold material although best results will be obtained with "dry molds" (i.e. shell molds, fired ceramic molds, etc.).

(c) Pouring temperatures will be determined by the complexity of the casting to be produced, its section size or sizes, and mass. Temperatures 250 to 500 degrees F. above the melting point prove most satisfactory. The lower temperature intended for preheated molds or fairly heavy castings and the higher temperature for small castings of thin section in room temperature molds. Melting point of the alloy is approximately 2375 degrees F. more or less depending on composition within the specification.

(d) The above melt formula will produce castings having a composition approximately as follows:

| | Percent by weight |
|---|---|
| Chromium | 28.60 |
| Cobalt | 17.00 |
| Iron | 5.30 |
| Vanadium | 2.05 |
| Molybdenum | 2.10 |
| Silicon | 1.10 |
| Carbon | 2.60 |
| Nickel | Balance (41.25) |

(e) Some elements will vary from the composition indicated by an amount dependent on type of melting unit employed, temperatures used, and time consumed in melting, and in some cases the refractory material used for furnace lining.

(f) It should be recognized that the materials used in the melt formula are one combination of many that are possible and permissible (i.e. careful use of secondary metals and analyzed scrap).

In addition to casting the alloys of this invention into the forms of various machine elements, they may be cast in the form of welding rods and applied by the welding technique, for example, so as to economize on the amount of alloy used. Thus, instead of casting valve seat inserts from the alloys, smaller amounts of the alloys may be welded in place as valve seat facings.

What is claimed as new is:

1. A wear resistant machine element of the class described comprising valves and valve inserts for internal combustion engines, burnishing balls and rollers, bearing balls and rollers and like products formed of an alloy having the following composition:

| | Percent by weight |
|---|---|
| Chromium | 25.00–32.00 |
| Cobalt | 13.00–20.00 |
| Iron | 9.0 maximum |
| Vanadium | 1.25–3.0 |
| Molybdenum | 1.25–3.0 |
| Silicon | 0.5–1.75 |
| Carbon | 1.75–3.50 |
| Nickel | Balance |

2. A wear resistant machine element of the class described comprising valves and valve inserts for internal combustion engines, burnishing balls and rollers, bearing balls and rollers and like products formed of an alloy having the following composition:

| | Percent by weight |
|---|---|
| Chromium | 26.50–30.50 |
| Cobalt | 15.00–17.00 |
| Iron | 9.0 maximum |
| Vanadium | 1.75–2.25 |
| Molybdenum | 1.75–2.25 |
| Silicon | 0.80–1.20 |
| Carbon | 2.20–2.80 |
| Nickel | Balance |

3. A wear resistant machine element of the class described comprising valves and valve inserts for internal combustion engines, burnishing balls and rollers, bearing balls and rollers and like products formed of an alloy having the following composition:

| | Percent by weight |
|---|---|
| Chromium | 28.00–29.50 |
| Cobalt | 15.00–15.50 |
| Iron | 9 maximum |
| Vanadium | 2.00–2.25 |
| Molybdenum | 2.00–2.25 |
| Silicon | 1.10–1.30 |
| Carbon | 2.60–2.80 |
| Nickel | Balance |

4. A wear resistant machine element of the class described comprising valves and valve inserts for internal combustion engines, burnishing balls and rollers, bearing balls and rollers and like products formed of an alloy having the following composition:

| | Percent by weight |
|---|---|
| Chromium | 29.50–30.50 |
| Cobalt | 16.50–17.00 |
| Iron | 9 maximum |
| Vanadium | 2.00–2.25 |
| Molybdenum | 2.00–2.25 |
| Silicon | 1.10–1.30 |
| Carbon | 2.60–2.80 |
| Nickel | Balance |

5. A wear resistant machine element of the class described comprising valves and valve inserts for internal combustion engines, burnishing balls and rollers, bearing balls and rollers and like products formed of an alloy having the following composition:

| | Percent by weight |
|---|---|
| Chromium | 26.00–27.00 |
| Cobalt | 16.50–17.00 |
| Iron | 9 maximum |
| Vanadium | 1.75–2.00 |
| Molybdenum | 1.75–2.00 |
| Silicon | .90–1.10 |
| Carbon | 2.20–2.50 |
| Nickel | Balance |

References Cited by the Examiner

UNITED STATES PATENTS

| | | | |
|---|---|---|---|
| 2,030,342 | 2/1936 | Wissler | 75—171 |
| 2,245,366 | 6/1941 | Rohn et al. | 75—171 |
| 2,246,078 | 6/1941 | Rohn et al. | 75—171 |
| 2,247,643 | 7/1941 | Rohn et al. | 75—171 |
| 2,551,170 | 5/1951 | Schmucker et al. | 75—171 |
| 2,783,144 | 2/1957 | Payson et al. | 75—171 |
| 2,827,371 | 3/1958 | Prasse et al. | 75—171 |
| 3,068,096 | 12/1962 | Elbaum et al. | 75—171 |

FOREIGN PATENTS

| | | |
|---|---|---|
| 494,621 | 7/1953 | Canada. |
| 572,339 | 3/1959 | Canada. |
| 572,451 | 3/1959 | Canada. |
| 510,154 | 7/1939 | Great Britain. |

DAVID L. RECK, *Primary Examiner.*

RAY K. WINDHAM, MARCUS U. LYONS, WINSTON A. DOUGLAS, *Examiners.*

UNITED STATES PATENT OFFICE
CERTIFICATE OF CORRECTION

Patent No. 3,234,015                        February 8, 1966

Douglas E. Jones

It is hereby certified that error appears in the above numbered patent requiring correction and that the said Letters Patent should read as corrected below.

Column 4, line 52, for "2,827,371" read -- 2,827,373 --.

Signed and sealed this 23rd day of August 1966.

(SEAL)
Attest:

ERNEST W. SWIDER                        EDWARD J. BRENNER
Attesting Officer                        Commissioner of Patents